United States Patent
Yang et al.

(10) Patent No.: US 9,591,689 B2
(45) Date of Patent: Mar. 7, 2017

(54) SYSTEM AND METHOD FOR DETACHMENT IN WIRELESS COMMUNICATION SYSTEM

(75) Inventors: Yong Yang, Mölndal (SE); Gunnar Rydnell, Västra Frölunda (SE); Ann-Christine Sander, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1121 days.

(21) Appl. No.: 13/075,958

(22) Filed: Mar. 30, 2011

(65) Prior Publication Data

US 2012/0250611 A1 Oct. 4, 2012

(51) Int. Cl.
*H04W 76/06* (2009.01)
*H04W 4/00* (2009.01)

(52) U.S. Cl.
CPC .......... *H04W 76/06* (2013.01); *H04W 4/005* (2013.01)

(58) Field of Classification Search
USPC ......................................... 370/311, 328, 331
See application file for complete search history.

(56) References Cited

U.S. PATENT DOCUMENTS

| | | | |
|---|---|---|---|
| 7,239,877 B2 * | 7/2007 | Corneille et al. | 455/456.3 |
| 2003/0012149 A1 * | 1/2003 | Maggenti et al. | 370/260 |
| 2003/0198198 A1 * | 10/2003 | Echavarri et al. | 370/328 |
| 2007/0287476 A1 * | 12/2007 | Jeong et al. | 455/456.6 |
| 2008/0320149 A1 * | 12/2008 | Faccin | 709/228 |
| 2009/0182883 A1 * | 7/2009 | Giaretta et al. | 709/228 |
| 2011/0034152 A1 * | 2/2011 | Khouri et al. | 455/413 |

FOREIGN PATENT DOCUMENTS

EP 2 299 770 3/2011

OTHER PUBLICATIONS

3rd Generation Partnership Project 2 "E-UTRAN—eHRPD Connectivity and Interworking: Core Network Aspects" Apr. 2009.*
International Search Report and Written Opinion, mailed Dec. 12, 2011, in corresponding Application No. PCT/EP2011/054932.
3GPP TS 23.401, No. V9.8.0 (Release 9), Mar. 18, 2011, pp. 1-259, XP050476357.
3GPP TS 22.368, No. V11.0.1, Feb. 11, 2011, pp. 1-23, XP054776264.
European Communication dated Jul. 4, 2016 issued in EP 11711101. 3, 4 pages.

* cited by examiner

*Primary Examiner* — Robert M Morlan
(74) *Attorney, Agent, or Firm* — Nixon & Vanderhye P.C.

(57) ABSTRACT

Example embodiments presented herein are directed towards a system and method for detachment in wireless communication systems. Some example embodiments are directed towards detaching a user from a wireless communications network without providing any signaling towards the user.

19 Claims, 7 Drawing Sheets

SYSTEM AND METHOD FOR DETACHMENT IN WIRELESS COMMUNICATION SYSTEM

BACKGROUND

In a typical cellular system, also referred to as a wireless communications network, wireless terminals, also known as mobile stations and/or User Equipment units (UEs) communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evaluation (LTE) together with Evolved Packet Core (EPC) is the newest addition to the 3GPP family.

Mobility management is an important function in maintaining cellular networks. The goal of mobility management is to track where cellular phones, or User Equipments (UEs), are located in order for mobile phone services to be provided to the various UEs comprised in any given network.

The network node typically responsible for mobility management is the Mobility Management Entity (MME). The MME is a key control node typically responsible for idle mode UE tracking, paging procedures, bearer activation/deactivation processes, and the MME is also responsible for choosing a Serving Gateway (SGW) for a particular UE.

One particular form of wireless communications is Machine-to-Machine (M2M) communications. Machine-to-Machine (M2M) is a technology which enables both wireless and wired systems to communicate with other devices. M2M communications may utilize a device (e.g., a meter) to capture an event (e.g., temperature or an energy level), which is relayed through a network (e.g., wireless, wired or hybrid) to an application (e.g., a software program), that translates the captured event into meaningful information (e.g., a user consumption reading and associated price).

SUMMARY

With the increasing use of mobile communications, current estimates indicate that a large number of users (e.g., in the range of 50 billion) may utilize a wireless networks at any given time. Thus, problems may arise with the risk of overloading an unnecessary network usage when large groups of terminals (e.g., as in M2M) try to access the network.

Many current network architectures/solutions do not prevent or even address the above mentioned problems other than by increased dimensioning (i.e., over-dimensioning which means higher costs). Due to the fact that M2M devices have a higher expectation (as compared to normal mobile terminals) to request network resources in a synchronized manner, the M2M devices may often be in an idle mode. Thus, M2M or MTC devices may unnecessarily use network resources.

Thus, example embodiments presented herein may be directed towards the optimization of the amount of network resources being utilized. In providing the optimization, the management of low mobility UEs or MTC devices may be employed. In some example embodiments, the determination of a low mobility UE or MTC device may be made if, for example, (1) an MTC does not move frequently and/or moves within a small area (e.g., health monitoring at home), (2) where an MTC does not move frequently but may move within a wide area (e.g., mobile sales terminals), and (3) when an MTC device is typically in a fixed location (e.g., water metering).

Some example embodiments may be directed towards a method for detaching a low mobility user from a wireless network. The method may comprise identifying a user as a low mobility user. The method may also comprise removing a Packet Data Network (PDN) connection between the low mobility user and the network, without signaling the low mobility user.

Some example embodiments may also comprise identifying that the user is stationary, has low mobility within a designated Tracking Area (TA) or Routing Area (RA), and/or has a known mobility pattern.

Some example embodiments may further comprise identifying the user is associated with an Access Point Name (APN) that may be designated for low mobility communications.

Some example embodiments may further comprise removing the PDN connection with a Mobility Management Entity (MME) or a Serving General Packet Radio Service (GPRS) Support Node (SGSN) node. Some example embodiments may further comprise identifying the low mobility user with a timer mechanism, the timer mechanism may be based on an attachment time and/or a period of inactivity.

Some example embodiments may further comprise removing the PDN connection with a PDN Gateway (PDN-GW) or a Gateway General Packet Radio Service (GPRS) Support Node (GGSN) node. Some example embodiments may further comprise identifying the low mobility user based on information received from a Policy and Charging Rules Function (PCRF) node.

Some example embodiments may further comprise partially removing mobility management content from a mobility management node. Some example embodiments may further comprise leaving an International Mobile Subscriber Identity (IMSI) and/or current location information, associated with the low mobility user, in the mobility management node and/or an external server.

Some example embodiments may further comprise receiving an information element classifying the user as a low mobility user.

Some example embodiments may be directed towards a node for detaching a low mobility user from the wireless network. The node may comprise an identification unit that may be configured to identify a user as a low mobility user. The node may also comprise a removal unit that may be configured to remove a Packet Data Network (PDN) connection between the low mobility user and the network, without signaling the low mobility user.

Some example embodiments may further comprise the node being configured to perform any of the method steps described above.

Some example embodiments may further comprise the node being a Mobility Management Entity (MME) or a Serving General Packet Radio Service (GPRS) Support Node (SGSN) node. Some example embodiments may further comprise the identification unit being configured to identify the user as a low mobility user with a timer mechanism; the timer mechanism may be based on an attachment time and/or a period of inactivity.

Some example embodiments may comprise the node being a PDN Gateway (PDN-GW) or a Gateway General Packet Radio Service (GPRS) Support Node (GGSN) node. Some example embodiments may comprise the identification unit being configured to identify the user as a low mobility user based on information received from a Policy and Charging Rules Function (PCRF) node.

Some example embodiments may be directed towards a computer readable storage medium that may be encoded with computer executable instructions, wherein the instructions, when executed by a node, may perform any of the method steps described above.

DEFINITIONS

AF Application Function
3GPP Third Generation Partnership Project
BSC Base Station Controller
DNS Domain Name System
eNodeB Evolved Node B
EPC Evolved Packet Core
EPS Evolved Packet System
E-UTRAN Evolved UTRAN
GERAN GSM EDGE Radio Access Network
GGSN Gateway GPRS Support Node
GPRS General Packet Radio Service
GSM Global System for Mobile communications
IMSI International Mobile Subscriber Identity
IP-CAN IP Connectivity Access Network
LTE Long Term Evolution
M2M Machine to Machine
MME Mobility Management Entity
MTC Machine Type Communication
PCC Policy and Charging Control
PCEF Policy and Charging Enforcement Function
PCRF Policy and Charging Rules Function
PDN Packet Data Network
PDP Packet Data Protocol
P-GW PDN Gateway
QoS Quality of Service
RBS Radio Base Station
RNC Radio Network Controller
SGSN Serving GPRS Support Node
S-GW Serving Gateway
TAI Tracking Area Index
TAU Tracking Area Update
UE User Equipment
UMTS Universal Mobile Telecommunications System
UTRAN Universal Terrestrial Radio Access Network

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments.

Figure 1:
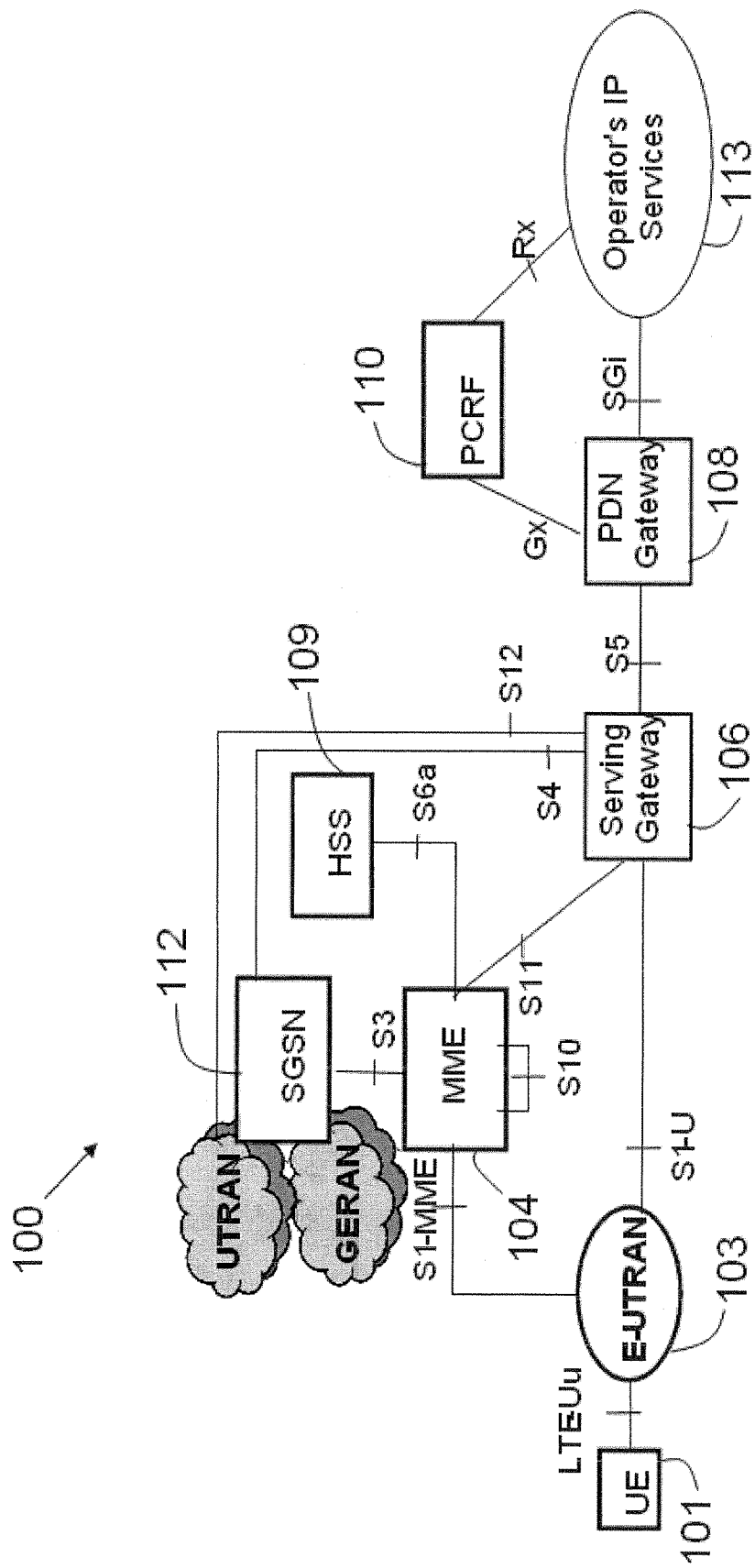
FIG. 1 is a schematic of a wireless network.
Figure 2:
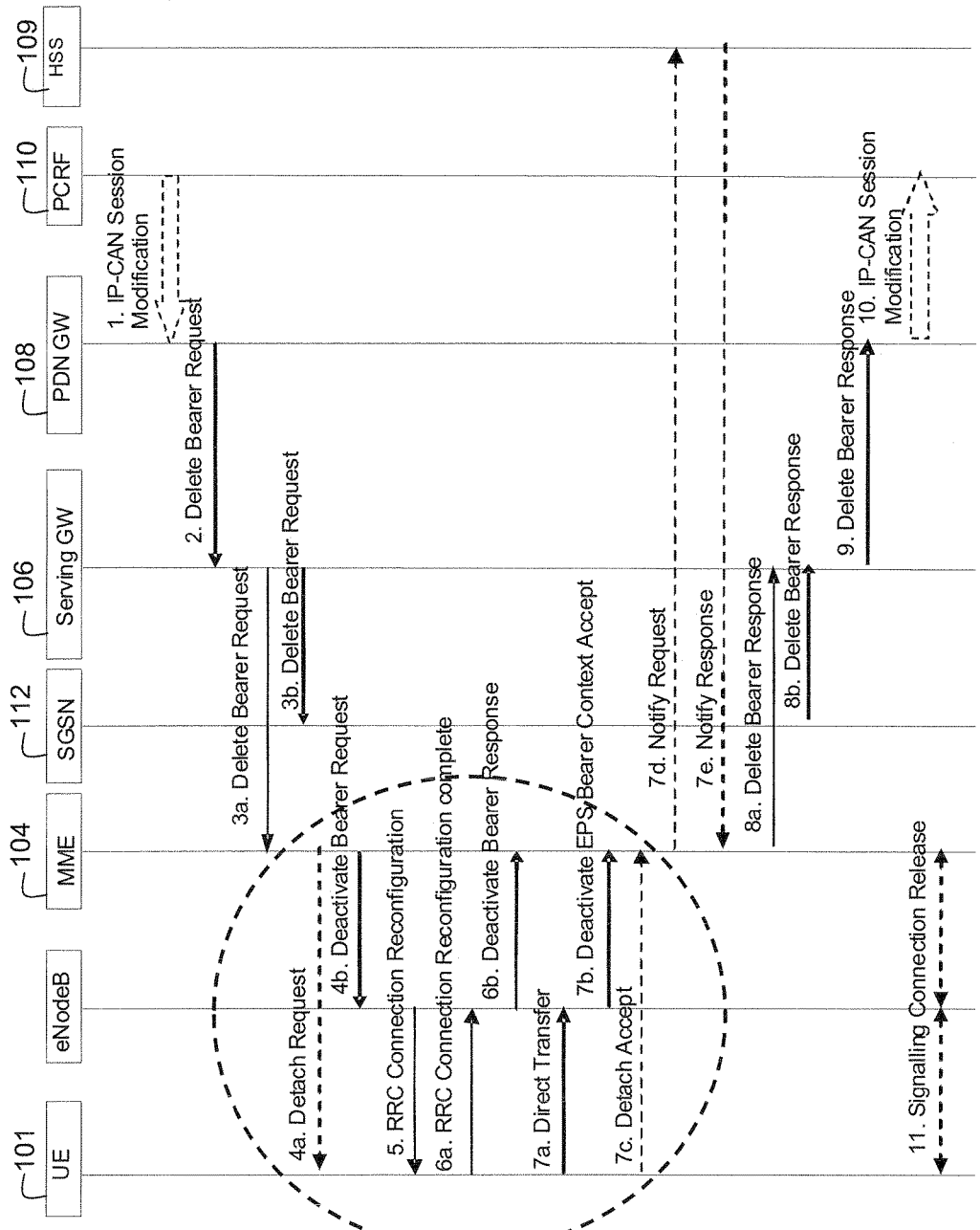
FIG. 2 is a message sequence diagram depicting an example of a P-GW initiated detachment.

FIG. 1 provides an example of a wireless communications network 100 and FIG. 2 is an example of a P-GW initiated bearer deactivation, or network detachment, known in the art. As shown in FIGS. 1 and 2, when an operator or service based 113 decision is made to detach a User 101 from a network, the PCRF node 110 may send a QoS policy to the P-GW node 108. This may be accomplished with a PCEF IP-CAN Session Modification procedure (message 1).

Thereafter, the P-GW 108 may send a Delete Bearer Request to the S-GW node 106 (message 2). The Delete Bearer Request may comprise an indication that all bearers belonging to PDN connections, associated with the UE 101 in question, should be released. The S-GW node 106 may in turn forward the Delete Bearer Request to a MME node 104 (message 3a). If ISR is activated, the S-GW node 106 may forward the Delete Bearer Request message to a SGSN node 106 (message 3b).

If the PDN connection being released is the last PDN connection associated with the UE 101, and the bearer deletion is not due to ISR deactivation or a handover process, the MME node 104 may detach the UE 101 by sending a Detach Request message and messages 5 through 7b are omitted (message 4a). If the current PDN connection being deactivated is not the last PDN connection associated with the UE 101, the MME node 104 sends a Deactivation Bearer Request message to the eNodeB (message 4b).

The eNodeB may thereafter send an RRC Connection Reconfiguration message, comprising bearer identification information, to the UE 101 (message 5). The UE 101 RRC may thereafter release the bearers indicated in message 5 and send a message to the eNodeB that the removal has been completed (message 6a). The eNodeB may send the MME node 104 an acknowledgment that the bearer deactivation has been completed (message 6b). The UE 101 may send a direct transfer to the eNobeB providing a Deactivate EPS Bearer Context Accept message (message 7a). The eNobeB may in turn send the Deactivate EPS Bearer Context Accept message to the MME node 104 (message 7b).

If the UE 101 received a Detach Request message from the MME node 104 (message 4a), the UE may send a Detach Accept message to the MME at any time after the Detach request message was sent (message 7c). If the current PDN connection being deactivated is the last PDN connection associated with the UE, the MME node 104 may thereafter send a Notify Request to the HHS node 109 to remove any corresponding APN and P-WG identity pairs (message 7d). After receiving the Notify Request from the MME node 104, the HSS node 109 may remove the identity pairs and send an acknowledgement response to the MME node 104 (message 7e).

Thereafter, the MME node 104 may delete the associated bearer context and acknowledge the bearer deactivation to the S-GW node 106 (message 8a). The SGSN node 112 may delete the PDP context related to the deactivated bearer and acknowledge the deactivation to the S-GW node 106 (message 8b).

The S-GW node 106 may delete the bearer context related to the deactivated bearer and acknowledge the bearer deactivation to the P-GW node 108 by sending a Delete Bearer Response message (message 9). The P-GW node 108 thereafter deletes the bearer context related to the deactivated bearer. If the deactivation procedure was triggered by a PCC decision, the P-GW node 108 may acknowledge the deactivation by completing the IP-CAN Session Modification procedure (message 10).

If the UE 101 was directly detached by the MME node 104, the MME node 104 may thereafter release the signaling connection for the UE 101 by sending a Release Signal Command message to the eNodeB and UE 101 (message 11).

Figure 3:
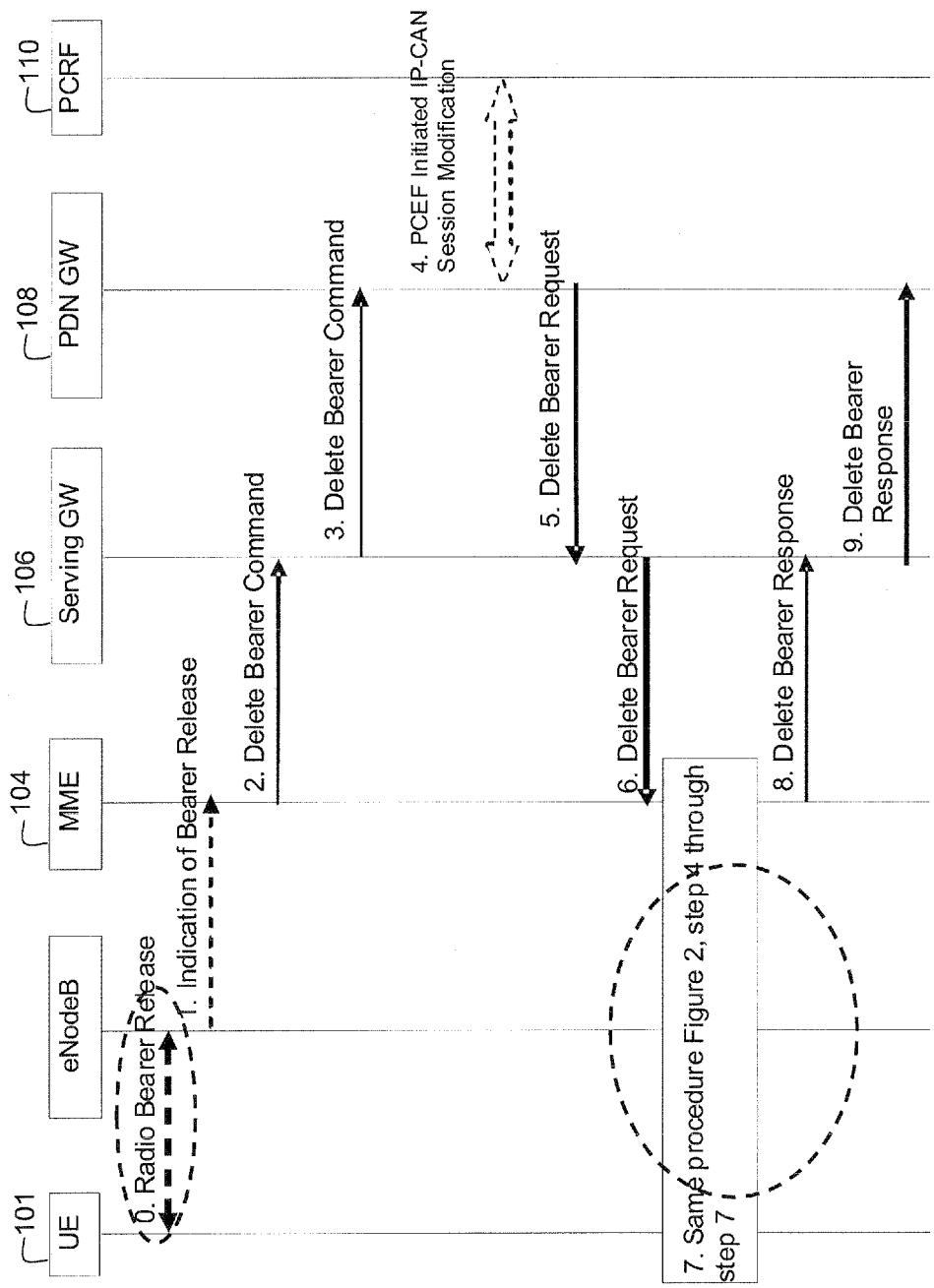
FIG. 3 is a message sequence diagram depicting an example of an MME initiated detachment.

FIG. 3 illustrates an example of an MME initiated bearer deactivation, or network detachment, known in the art. As shown in FIG. 3, radio bearers for the UE 101 may be released for a number of reasons (e.g., network resource limitations), which may case the eNodeB to release the bearers (message 0). Upon releasing the bearers, the eNodeB may send an indication message to the MME node 104 (message 1). The MME node 104 may in turn send a Delete Bearer Command message for each PDN connection to the S-GW node 106 (message 2).

Thereafter, the S-GW node 106 may send the Delete Bearer Command message (for each PDN connection) to the P-GW node 108 (message 3). If a PCC infrastructure is utilized, the P-GW node 108 may inform the PCRF 110 about the bearer deletion with the use of a PCEF-initiated IP-CAN Session Modification procedure (message 4). The P-GW 108 node may also send a Delete Bearer Request to the S-GW node 106 (message 5).

The S-GW node 106 may then forward the Delete Bearer Request to the MME node 104 (message 6). Message 7 comprises messages 4 through 7 of FIG. 2 and therefore will not be discussed in relation to FIG. 3. The MME node 104 may thereafter delete the bearer contexts related to the deactivated bearer and send an acknowledgement message to the S-GW node 106 (message 8). The S-GW 106 may in turn delete the bearer context related to the deactivated bearer and acknowledge the deletion to the P-GW node 108 (message 9).

As illustrated in FIGS. 2 and 3, a large amount of signaling (highlighted by slashed circles) is directed towards the UE 101. Thus, some example embodiments disclosed herein may be directed towards an optimized utilization of network resources by detaching low mobility users. Furthermore, the process of detaching low mobility users may be further optimized by reducing, or eliminating, signaling directed to the user.

Figure 4:
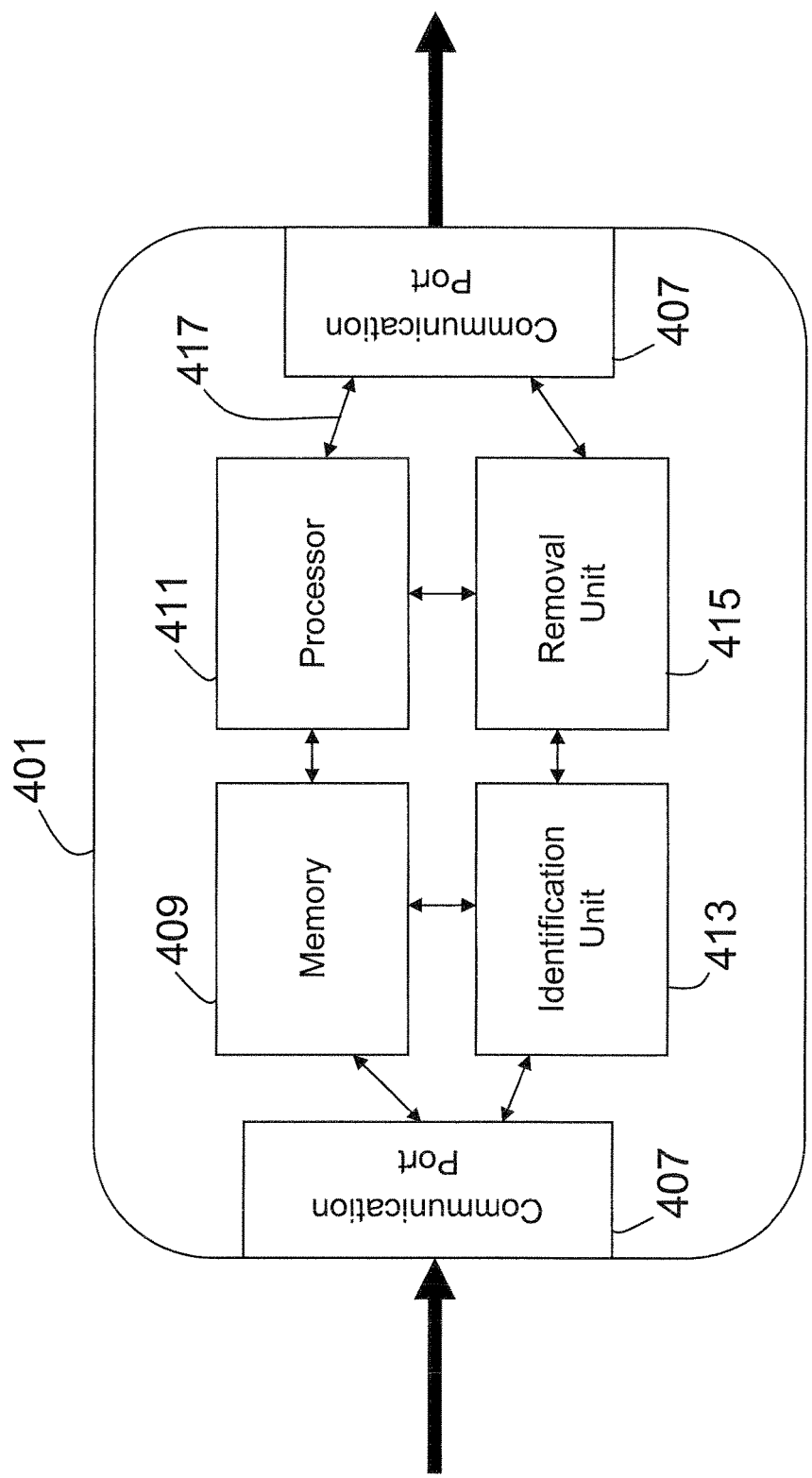
FIG. 4 is a schematic of a network node according to some of the example embodiments.

FIG. 4 illustrates an example network node 401 which may employ some of the example embodiments presented herein. The network node 401 may comprise any number of communication ports 407 that may be configured to receive and transmit any form of communication data. It should be appreciated that the network node 401 may alternatively comprise a single transceiver port. It should further be appreciated that the communication ports, or transceiver port, may be in the form of any input/output communications port known in the art.

The network node 401 may further comprise at least one memory unit 409 that may be in communication with the communication ports 407. The memory unit 409 may be configured to store received and/or transmitted data, location and/or identification based data, and/or executable program instructions. The memory unit 409 may be any suitable type of computer readable memory and may be of volatile and/or non-volatile type.

The network node 401 may further comprise a processing unit 411. The processing unit 411 may be configured to execute program instructions. The network node 401 may further comprise an identification unit 413. The identification unit 413 may be configured to identify a user as a low mobility user. The identification unit 413 may be configured to identify the low mobility user based on a received flag or message type. The identification until 413 may further be able to identify the low mobility user based on a timing mechanism and/or any other communication characteristics that may be used as measureable thresholds.

The network node 401 may also comprise a removal unit 415. The removal unit 415 may be configured to remove a PDN connection between the low mobility user and the network, without forwarding any messages or signaling to the user.

It should be appreciated that the processing unit 411, identification unit 413, and/or removal unit 415 may be any suitable type of computation unit, e.g. a microprocessor, digital signal processor (DSP), field programmable gate array (FPGA), or application specific integrated circuit (ASIC). It should further be appreciated that the processing unit 411, identification unit 413, and/or removal unit 415 may be comprised as a single computation unit or any number of computation units.

It should further be appreciated that the network node 401 may be in the form of an MME network node and/or a P-GW network node. It should also be appreciated that the network node may be in the form of a SGSN and/or GGSN network node. It should further be appreciated that the network node 401 may be in the form of a stand-alone node in the network.

Figure 5:
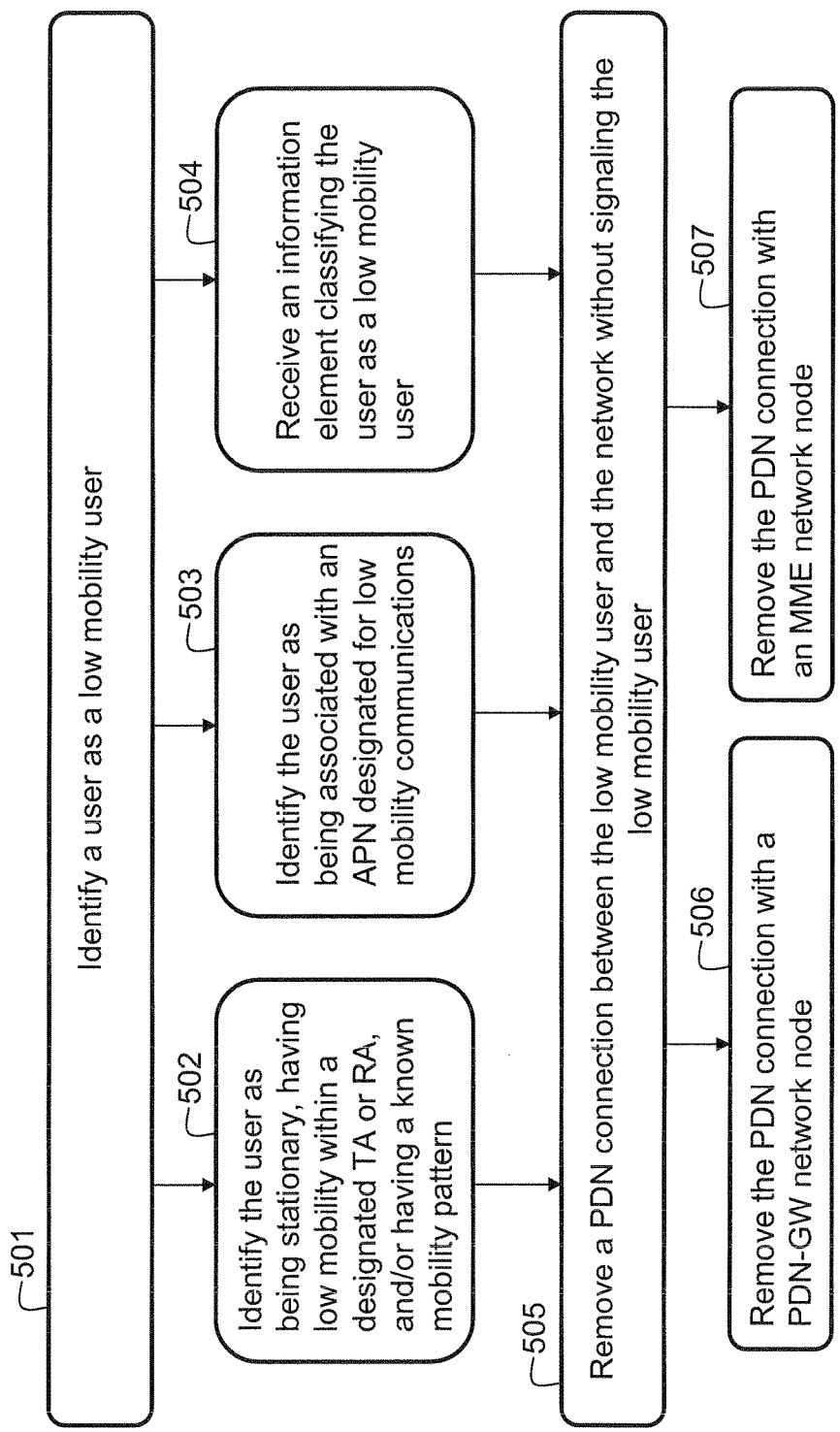
FIG. 5 is a flow diagram of example operational steps which may be taken by the network node of FIG. 4, according to some of the example embodiments.
Figure 6:
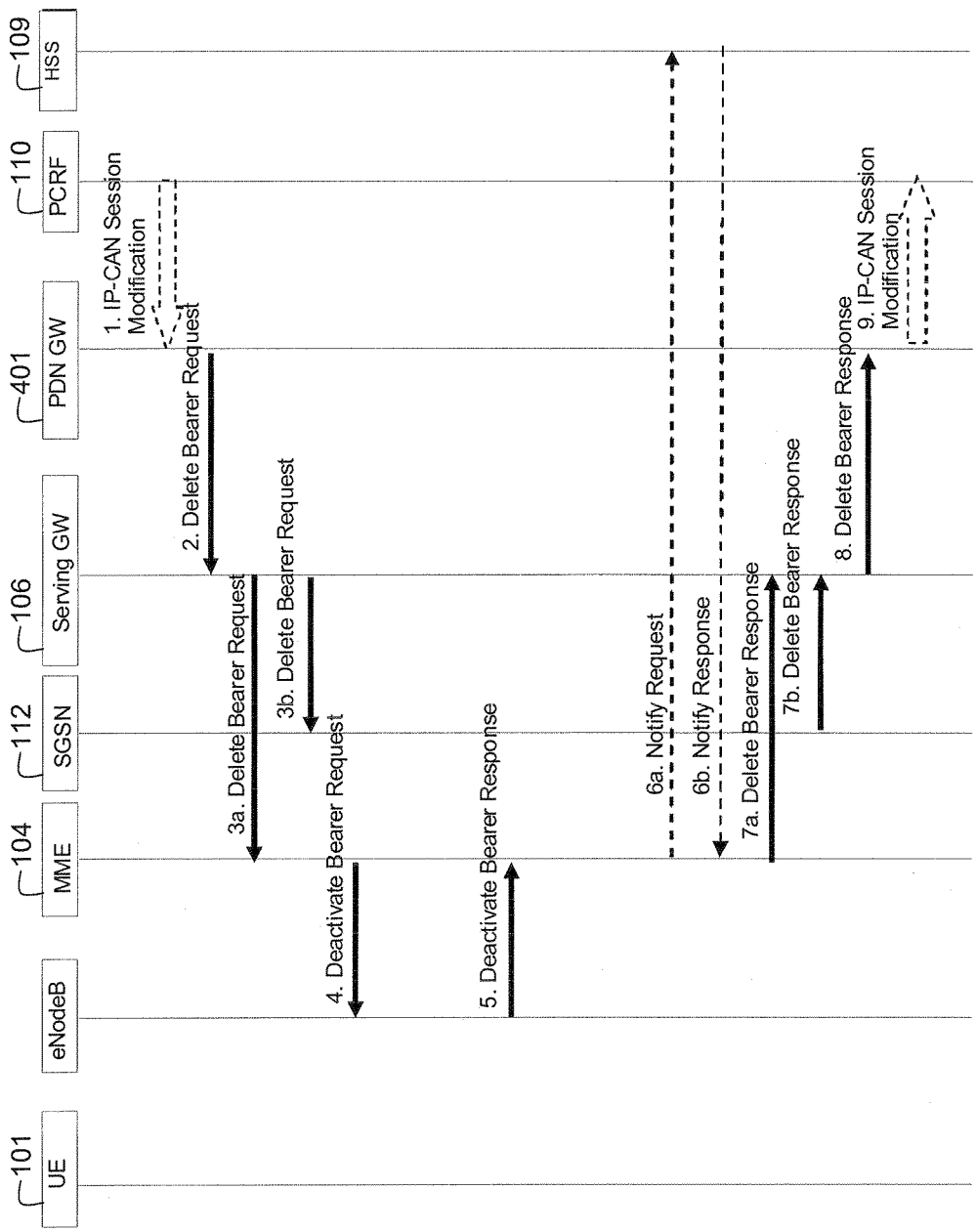
FIG. 6 is a message sequence diagram depicting an example of a P-GW initiated detachment, according to some of the example embodiments.

FIG. 5 is a flow diagram depicting example operational steps which may be taken by the network node 401 of FIG. 4. FIG. 6 is a message sequence diagram depicting an example of a P-GW node 108 initiated detachment. In the example provided by FIG. 6, the network node 401 depicted in FIG. 4 is the P-GW node.

In the example provided by FIG. 6, the decision to remove the UE 101 from the network may originate from the PCRF 110, AF, and/or an MTC server 113. The decision to detach the UE 101 from the network may be based on the mobility of the UE.

Thus, the PCRF 110 may send an IP-CAN Session Modification to the P-GW node 401 (message 1). The message sent by the PCRF 110 may comprise data or an information element (e.g., a flag) used for low mobility indication.

Upon receiving the message from the PCRF 110, the identification unit 413 of the P-GW node 401 may determine the mobility of the user. In determining the mobility of the UE, the following factors may be considered: (1) if the user does not move frequently and/or moves within a small area (e.g., health monitoring at home) (502), (2) if the user does not move frequently but moves within a wide area (e.g., mobile sales terminals) (503), and (3) if the user is typically in a fixed location (e.g., water metering) (504). It should be appreciated that other means of determining the mobility of a user may also be employed. For example, the user may be associated with an APN dedicated to low mobility users. Furthermore, the decision to detach the user may also be determined from specific service parameters provided by an operator. In some example embodiments, a low mobility user may be identified by an association with an IMSI/IMEI number series designated for low mobility users. In some example embodiments, the HSS may provide an indication of a UE mobility status. It should also be appreciated that the message sent by the PCRF 110 may be a GTP specific message designated for the detachment of low mobility users.

Once the identification unit 413 of the P-GW node 401 classifies the User 101 as a low mobility user, the removal unit 415 of the P-GW 401 may formulate and send a message to the S-GW node 106 indicating that the PDN connection between the low mobility user and the network should be deleted without signalling the user (505, 506) (message 2). Upon receiving the message, the S-GW node 106 may forward the deletion message to the associated MME node 104 or SGSN node 112 (message 3a, 3b).

Thereafter, the MME node 104 may forward the deletion message to the eNodeB (message 4). The eNodeB thereafter deactivates the PDN connection and sends an acknowledgement message to the MME node 104 (message 5). The MME node 104 may in turn send a Notify Request to remove identity pairs associated with the PDN connection to the HSS 109 and the HSS 109 may thereafter send a Notify Response back to the MME node 104 (message 6d, 6e).

The MME node 104 and the SGSN node 112 may thereafter delete bearers associated with the low mobility User 101 and send an acknowledge responses to the S-GW node 106 (message 7a, 7b). Thereafter, the S-GW node 106 may also delete the bearer context associated with the low mobility User 101 and send a response message to the P-GW node 401 (message 8). The removal unit 415 of the P-GW node 401 may thereafter delete the bearer context associated with the low mobility User 101 and send a message to the PCRF 110 that PDN connection deletion has been successfully performed (message 9).

Figure 7:
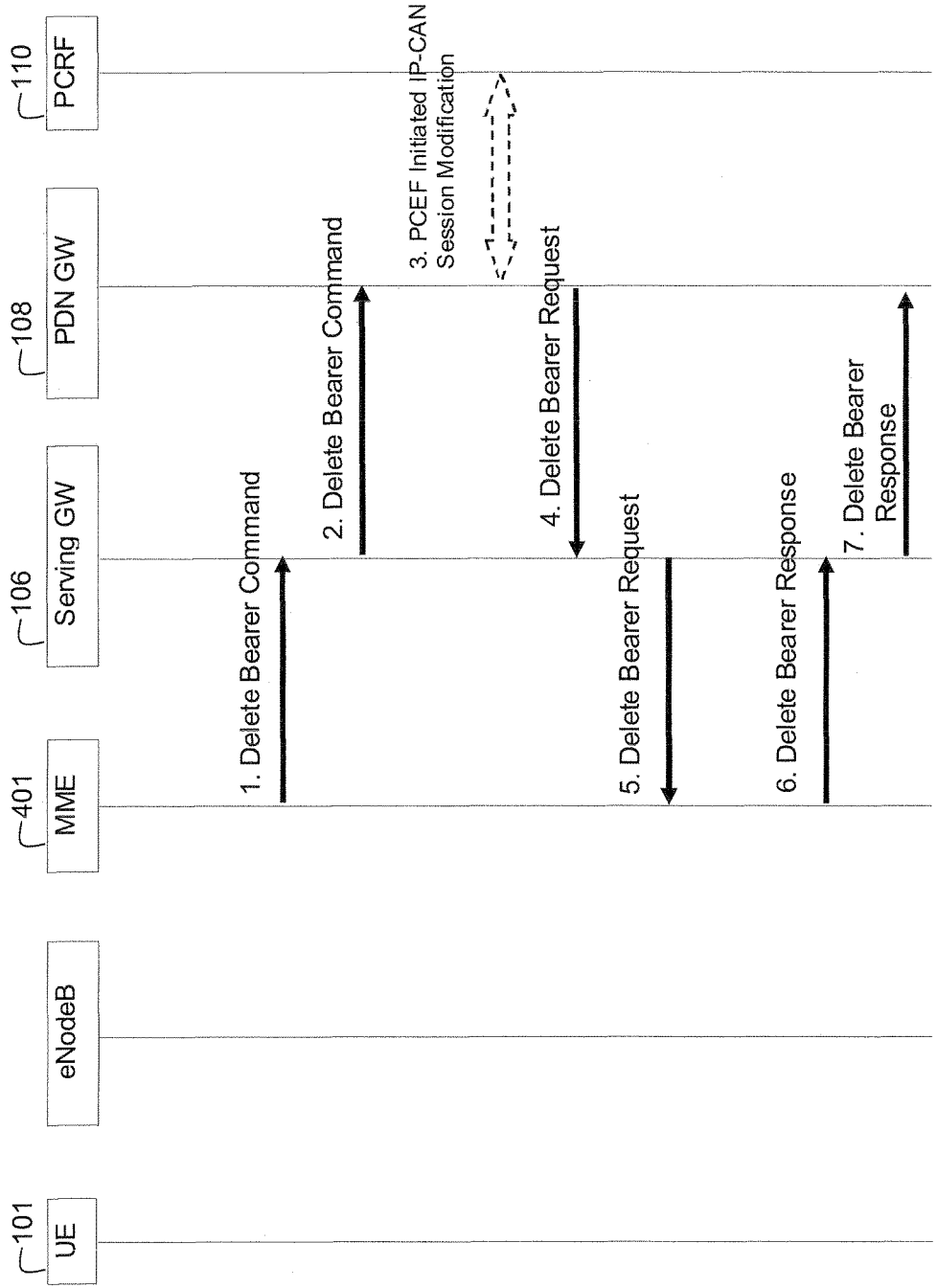
FIG. 7 is a message sequence diagram depicting an example of an MME initiated detachment, according to some of the example embodiments.

FIG. 7 is a message sequence diagram depicting an example of an MME node 104 initiated detachment. In the example provided by FIG. 7, the network node 401 depicted in FIG. 4 is the MME node.

In the example provided in FIG. 7, the decision to remove a user from the network may originate from an MME node 401. In making the decision to remove the user, the identification unit 413 of the MME node 401 may consider whether or not the user is a low mobility user (501). In determining the mobility of the UE, the following factors may be considered: (1) if the user does not move frequently and/or moves within a small area (e.g., health monitoring at home) (502), (2) if the user does not move frequently but moves within a wide area (e.g., mobile sales terminals) (503), and (3) if the user is typically in a fixed location (e.g., water metering) (504). It should be appreciated that other means of determining the mobility of a user may also be employed. For example, a timing mechanism may be employed. The timing mechanism may be configured to monitor a period of non-activity or non-mobility. The timing mechanism may also be configured to monitor a predetermined period of time upon which a user is to be detached. In some example embodiments, a low mobility user may be identified by an association with an IMSI/IMEI number series designated for low mobility users. It should also be appreciated that the message sent by the PCRF 110 may be a GTP specific message designated for the detachment of low mobility users.

Once the MME node 401 has determined that the User 101 is a low mobility user, the removal unit 415 of the MME node 401 may initiate the process of removal without user signalling by formulating and sending a message to the S-GW node 106 (505, 507) (message 1). The S-GW node 106 may in turn forward the removal message to the P-GW node 108 (message 2). Upon receiving the removal message, the P-GW node 108 may thereafter inform the PCRF 110 of the removal decision and the PCRF 110 may forward an its own removal decision to the P-GW node 108 (message 3).

If removal is to proceed, the P-GW node 108 may forward a Delete Bearer Request message to the S-GW node 106 (message 4). The S-GW node 106 may thereafter forward the Delete Bearer Request message to the MME node 401 (message 5). Thereafter, the removal unit 415 of the MME node 401 may deactivate the PDN connection associated with the low mobility user. The MME node 401 may also send an acknowledgement message to the S-GW node 106 (message 6). The S-GW node 106 may in turn deactivate the PDN connection associated with the low mobility user and send an acknowledgment message to the P-GW node 108 (message 7).

As should be appreciated from the examples illustrated in FIGS. 6 and 7 the removal of a low mobility user may be performed without additional signaling to the user. It should further be appreciated that some example embodiments may comprise a partial removal of the user. During a partial removal of the user, the network node 401 may indicate that some mobility management content (e.g., location and/or identification information) should remain in the MME, S-GW, and/or P-GW nodes. It should further be appreciated that mobility management content may alternatively, or in addition, be saved in an external sever. Saving such information on an external server may allow the PCC to send identification or location information to the mobility management node for connection re-establishment.

The examples provided in FIGS. 6 and 7 are directed towards example embodiments utilizing the MME and P-GW nodes. However, it should be appreciated that some example embodiments may also be applied in a GPRS system, wherein some example embodiments may be applied to a SGSN network node in a similar manner as applied in the MME network node. Similarly, some example embodiments may be applied to a GGSN network node in a similar manner as applied to a P-GW network node.

It should further be appreciated that in some example embodiments information or information elements classifying a user as a low mobility user may be transferred over S6a (e.g., between MME and the HSS nodes), S11/S4 (e.g., between MME/SGSN and the S-GW nodes), and S5/S8 (e.g., between the S-GW and the P-GW nodes).

The example embodiments presented herein aid in the optimization of network resources, thereby enabling operators to have lower charging fees. If a user needs to send uplink data, the user may send a request to reattach to the network. Similarly, if downlink data is to be transmitted to a detached user, a page may be sent to the detached user so that the user can reattach to the network.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

A "device" as the term is used herein, is to be broadly interpreted to comprise a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a personal digital assistant (PDA) that can comprise a radiotelephone or wireless communication system; a laptop; a camera (e.g., video and/or still image camera) having communication ability; and any other computation or communication device capable of transceiving, such as a personal computer, a home entertainment system, a television, smart phone, touch phone, tablet computer, etc.

The various embodiments of the present invention described herein is described in the general context of method steps or processes, which may be implemented in one embodiment by a computer program product, embodied in a computer-readable medium, including computer-executable instructions, such as program code, executed by computers in networked environments. A computer-readable medium may comprise removable and non-removable storage devices including, but not limited to, Read Only Memory (ROM), Random Access Memory (RAM), compact discs (CDs), digital versatile discs (DVD), flash memory, EEPROM, etc. Generally, program modules may comprise routines, programs, objects, components, data structures, etc. that perform particular tasks or implement particular abstract data types. Computer-executable instructions, associated data structures, and program modules represent examples of program code for executing steps of the methods disclosed herein. Such instructions may be executed by the processing unit, e.g., central processing unit, microcontroller, microprocessor, field programmable gate array, application specific integrated circuit, digital signal processor, etc. The particular sequence of such executable instructions or associated data structures represents examples of corresponding acts for implementing the functions described in such steps or processes.

Modifications and other embodiments of the disclosed invention(s) will come to mind to one skilled in the art having the benefit of the teachings present in the foregoing descriptions and the associated drawings. Therefore, it is to be understood that the invention(s) is/are not to be limited to the specific embodiments disclosed and that modifications and other embodiments are intended to be comprised within the scope of this disclosure. Although specific terms may be employed herein, they are used in a generic and descriptive sense only and not for purpose of limitation.

The invention claimed is:

1. A method for detaching a low mobility user from a wireless network, the method comprising:
   identifying a user as a low mobility user; and
   removing a Packet Data Network (PDN) connection between the low mobility user and the network, without signaling the low mobility user,
   wherein removing the PDN connection between the low mobility user and the network further comprises partially removing mobility management content from a mobility management node.

2. The method of claim 1, wherein the identifying the user as a low mobility user further comprises identifying that the user is stationary, has low mobility within a designated Tracking Area (TA) or Routing Area (RA), and/or has a known mobility pattern.

3. The method of claim 1, wherein identifying the user as a low mobility user further comprises identifying the user is associated with an Access Point Name (APN) designated for low mobility communications.

4. The method of claim 1, wherein removing the PDN connection further comprises removing the PDN connection with a Mobility Management Entity (MME) or a Serving General Packet Radio Service (GPRS) Support Node (SGSN) node.

5. The method of claim 1, wherein identifying the user as a low mobility user further comprises identifying the low mobility user with a timer mechanism, the timer mechanism being based on an attachment time and/or a period of inactivity.

6. The method of claim 1, wherein removing the PDN connection further comprises removing the PDN connection with a PDN Gateway (PDN-GW) or a Gateway General Packet Radio Service (GPRS) Support Node (GGSN) node.

7. The method of claim 6, wherein identifying the user as a low mobility user further comprises identifying the low mobility user based on information received from a Policy and Charging Rules Function (PCRF) node.

8. The method of claim 1, wherein removing the PDN connection further comprises leaving an International Mobile Subscriber Identity (IMSI) and/or current location information, associated with the low mobility user, in the mobility management node and/or an external server.

9. The method of claim 1, wherein identifying the user as a low mobility user further comprises receiving an information element classifying the user as a low mobility user.

10. A node for detaching a low mobility user from the wireless network, the node comprising:
    an identification unit configured to identify a user as a low mobility user; and
    a removal unit configured to remove a Packet Data Network (PDN) connection between the low mobility user and the network, without signaling the low mobility user, wherein the removal unit is further configured to partially removing mobility management content from a mobility management node.

11. The node of claim 10, wherein the identification unit is further configured to identify the user as a low mobility user if the user is stationary, has low mobility within a designated Tracking Area (TA) or Routing Area (RA), and/or has a known mobility pattern.

12. The node of claim 10, wherein the identification unit is further configured to identify the user as a low mobility user if the user is associated with an Access Point Name (APN) designated for low mobility communications.

13. The node of claim 10, wherein the node is a Mobility Management Entity (MME) or a Serving General Packet Radio Service (GPRS) Support Node (SGSN) node.

14. The node of claim 1, wherein the identification unit is further configured to identify the user as a low mobility based on a timer mechanism, the timer mechanism configured to detect a period of attachment and/or inactivity of a user.

15. The node of claim 1, wherein the node is a PDN Gateway (PDN-GW) or a Gateway General Packet Radio Service (GPRS) Support Node (GGSN) node.

16. The node of claim 15, wherein the identification unit is further configured to identify the user as a low mobility based on information received from a Policy and Charging Rules Function (PCRF) node.

17. The node of claim 10, wherein the removal unit is further configured to leave an International Mobile Subscriber Identity (IMSI) and/or current location information, associated with the low mobility user, in the mobility management node and/or an external server.

18. The node of claim 10, wherein the identification unit is further configured to receive an information element classifying the user as a low mobility user.

19. A computer readable, non-transitory storage medium encoded with computer executable instructions, wherein the instructions, when executed by a node, perform a method comprising:
   identifying a user as a low mobility user; and
   removing a Packet Data Network (PDN) connection between the low mobility user and the network, without signaling the low mobility user,
   wherein removing the PDN connection between the low mobility user and the network further comprises partially removing mobility management content from a mobility management node.

* * * * *